US012612811B2

(12) United States Patent
Young et al.

(10) Patent No.: US 12,612,811 B2
(45) Date of Patent: Apr. 28, 2026

(54) DOOR LOCK DEVICES AND METHODS OF USE

(71) Applicant: Toyota Motor Engineering & Manufacturing North America, Inc., Plano, TX (US)

(72) Inventors: Timothy S. Young, Dry Ridge, KY (US); Cody D. Williams, Georgetown, KY (US); William M. Criswell, Lexington, KY (US); John F. Booth, Georgetown, KY (US); Rick Gilbert, Nicholasville, KY (US); Adam S. Rodgers, Georgetown, KY (US); Derrick Taylor, Georgetown, KY (US); Roger D. Hilbert, Versailles, KY (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 18 days.

(21) Appl. No.: 18/527,755

(22) Filed: Dec. 4, 2023

(65) Prior Publication Data

US 2025/0179848 A1 Jun. 5, 2025

(51) Int. Cl.
*E05C 17/02* (2006.01)

(52) U.S. Cl.
CPC .................................... *E05C 17/02* (2013.01)

(58) Field of Classification Search
CPC .......... E05C 17/02; E05C 17/12; E05C 17/24; E05C 17/36; E05C 17/38; E05C 17/50; Y10T 292/305; Y10T 292/283; Y10T 292/296; E05B 2015/0235; E05B 57/00; E05B 63/0052; E05B 65/06; B62D 33/037
See application file for complete search history.

(56) References Cited

U.S. PATENT DOCUMENTS

| | | | | | |
|---|---|---|---|---|---|
| 546,102 | A * | 9/1895 | Jenkins | E05C 17/365 | 292/264 |
| 807,779 | A * | 12/1905 | Rinald | E05C 17/365 | 292/264 |
| 832,420 | A * | 10/1906 | Rinaldy | E05C 17/365 | 292/264 |
| 880,214 | A * | 2/1908 | Henninges | E05C 17/365 | 292/264 |

(Continued)

FOREIGN PATENT DOCUMENTS

| | | | |
|---|---|---|---|
| AT | 150327 | B * | 8/1937 |
| DE | 357075 | C * | 8/1922 |

(Continued)

OTHER PUBLICATIONS

GB2123779 Image merged with text (Year: 2025).*

*Primary Examiner* — Steven A Tullia
(74) *Attorney, Agent, or Firm* — Dinsmore & Shohl LLP

(57) ABSTRACT

A door lock device includes a base plate and a pivot hook connected to the base plate that is configured to pivot about a pivot axis. A guard arm is connected to the base plate that extends past an end of the pivot hook such that the pivot hook rests against the guard arm when pivoted to an engaged position. The pivot hook is configured to be biased against guard arm due, at least in part, to a force applied by a chain connected to the pivot hook.

9 Claims, 2 Drawing Sheets

(56) References Cited

U.S. PATENT DOCUMENTS

| | | | | | |
|---|---|---|---|---|---|
| 890,518 | A * | 6/1908 | Kleidmann | E05C 17/365 | 292/264 |
| 1,280,163 | A * | 10/1918 | Clarkson | F16G 15/04 | 24/116 R |
| 1,400,315 | A * | 12/1921 | Reed | E05C 17/04 | 292/278 |
| 1,422,128 | A * | 7/1922 | Rager | A47B 81/00 | 248/306 |
| 1,540,854 | A * | 6/1925 | Mack | B60D 1/04 | 24/115 F |
| 1,754,043 | A * | 4/1930 | Port | F16B 45/023 | 24/598.5 |
| 1,759,677 | A * | 5/1930 | Wine | B61D 7/16 | 105/310.1 |
| 1,930,790 | A * | 10/1933 | Dick | F16B 45/034 | 24/68 TT |
| 2,075,015 | A * | 3/1937 | Beaumont | E05C 17/365 | 292/264 |
| 2,182,439 | A * | 12/1939 | Kalbfell | F16B 45/027 | 24/598.5 |
| 2,790,663 | A * | 4/1957 | Sarver | E05B 73/0005 | 292/264 |
| 3,292,226 | A * | 12/1966 | Foster | F16B 45/026 | 24/601.5 |
| 3,401,969 | A * | 9/1968 | Neel | E05C 17/365 | 292/264 |
| 3,544,154 | A * | 12/1970 | Ford | B60P 1/16 | 292/264 |
| 3,720,431 | A * | 3/1973 | Oliver | E05C 19/00 | 292/264 |
| 3,738,694 | A * | 6/1973 | Banse | E05C 17/365 | 292/264 |
| 4,186,958 | A | 2/1980 | Welch | | |
| 4,196,876 | A * | 4/1980 | Maughlin | F16B 45/023 | 244/3 |
| 4,231,327 | A * | 11/1980 | Mader | A01K 1/064 | 119/772 |
| 4,254,975 | A * | 3/1981 | Miller | E05B 73/0005 | 292/264 |
| 4,269,439 | A * | 5/1981 | Warwick | E05C 17/36 | 292/246 |
| 4,422,678 | A * | 12/1983 | Tuckett | E05B 73/0005 | 292/264 |
| 4,472,143 | A | 9/1984 | Bennett et al. | | |
| 4,560,191 | A * | 12/1985 | Grassi | E05C 17/365 | 292/264 |
| 4,889,372 | A | 12/1989 | Dege et al. | | |
| 4,993,760 | A * | 2/1991 | Gotanda | E05C 17/365 | 292/264 |
| 5,022,694 | A * | 6/1991 | Thomison | F16B 45/026 | 24/116 R |
| 5,329,883 | A * | 7/1994 | White | A01K 27/005 | 119/779 |
| 5,551,739 | A * | 9/1996 | Solis | E05C 17/365 | 292/264 |
| 5,573,289 | A * | 11/1996 | Littlefair | E05C 17/36 | 292/259 R |
| 5,575,536 | A * | 11/1996 | Wallan | B60P 1/26 | 298/23 A |
| 5,664,304 | A * | 9/1997 | Tambornino | B66C 1/36 | 294/82.19 |
| 5,832,572 | A * | 11/1998 | Norrby | B60P 7/0807 | 24/600.9 |
| 5,956,980 | A * | 9/1999 | Jenkins, Jr. | F16G 15/00 | 24/598.5 |
| 5,984,250 | A * | 11/1999 | Connor | A47G 25/0607 | 294/82.19 |
| 6,364,381 | B1 * | 4/2002 | Schmidt | E01F 13/028 | 292/264 |
| 6,477,752 | B1 * | 11/2002 | van der Greft | A44C 5/2038 | 63/3.1 |
| 6,478,348 | B2 * | 11/2002 | Lahey | E05C 17/36 | 292/264 |
| 6,772,488 | B1 * | 8/2004 | Jensen | F16B 45/036 | 24/599.6 |
| 7,926,152 | B2 * | 4/2011 | Emenheiser | F16B 45/023 | 24/600.9 |
| 8,117,721 | B2 * | 2/2012 | Yang | F16B 45/032 | 24/600.1 |
| 9,228,375 | B1 * | 1/2016 | Arnold | E05B 67/003 | |
| 10,780,301 | B2 * | 9/2020 | Hester | A62B 35/0068 | |
| 2005/0015945 | A1 * | 1/2005 | Jensen | F16B 45/036 | 24/599.6 |
| 2009/0033106 | A1 | 2/2009 | West | | |
| 2017/0074013 | A1 * | 3/2017 | Doherty | E05C 17/365 | |

FOREIGN PATENT DOCUMENTS

| | | | | | |
|---|---|---|---|---|---|
| GB | 1155157 | A * | 6/1969 | E05B 73/0005 |
| GB | 2123779 | A * | 2/1984 | G09F 21/12 |
| JP | 6974225 | B2 | 12/2021 | |
| NZ | 272291 | A * | 1/1997 | E05C 19/00 |
| SU | 1275171 | A1 * | 12/1986 | |

* cited by examiner

DOOR LOCK DEVICES AND METHODS OF USE

TECHNICAL FIELD

The present specification generally relates to door lock devices and associated methods, and more specifically, door lock devices that hold swinging doors in open positions.

BACKGROUND

Door locks exist that hold doors in open positions. In particular, many trailers have door locks that can be used to hold a swinging door open. These door locks often have an unlock prevention mechanism that inhibits unintended closing of the door. However, it is not uncommon for operators to bypass the unlock prevention mechanism. What is needed are other door locks that are more difficult to bypass the unlock prevention mechanism.

SUMMARY

In one embodiment, a door lock device includes a base plate and a pivot hook connected to the base plate that is configured to pivot about a pivot axis. A guard arm is connected to the base plate that extends past an end of the pivot hook such that the pivot hook rests against the guard arm when pivoted to an engaged position. The pivot hook is configured to be biased against guard arm due, at least in part, to a force applied by a chain connected to the pivot hook.

In another embodiment, a trailer includes a trailer door that is pivotally mounted to the trailer and a door lock device that includes a base plate mounted to the trailer. A pivot hook is connected to the base plate configured to pivot about a pivot axis. A guard arm is connected to the base plate that extends past an end of the pivot hook such that the pivot hook rests against the guard arm when pivoted to an engaged position. The pivot hook is configured to be biased against guard arm due, at least in part, to a force applied by a chain hooked to the pivot hook.

In another embodiment, a method of securing a trailer door of a trailer door in an open position using a door lock device is provided. The method includes mounting the door lock device to the trailer adjacent the trailer door. The door lock device includes a base plate that is configured to mount to the trailer and a pivot hook that is connected to the base plate configured to pivot about a pivot axis. A guard arm is connected to the base plate that extends past an end of the pivot hook such that the pivot hook rests against the guard arm when pivoted to an engaged position. The pivot hook is configured to be biased against guard arm due, at least in part, to a force applied by a chain hooked to the pivot hook. The pivot hook is pivoted toward an open position providing a gap between the pivot hook and the guard arm. A link of a flexible, elongated connector mounted to the trailer door is placed around the pivot hook with the pivot hook in the open position. The pivot hook is placed in the closed position and resting against the guard arm with the link around the pivot hook.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

The present description is generally directed to a door lock device that includes a base plate and a pivot hook that is connected to the base plate that pivots about a pivot axis. A guard arm is connected to the base plate that extends past a free end of the pivot hook such that the pivot hook can rest against the guard arm when pivoted to an engaged position. The pivot hook is configured to be biased against guard arm due, at least in part, to a force applied by a chain hooked to the pivot hook.

Figure 1:
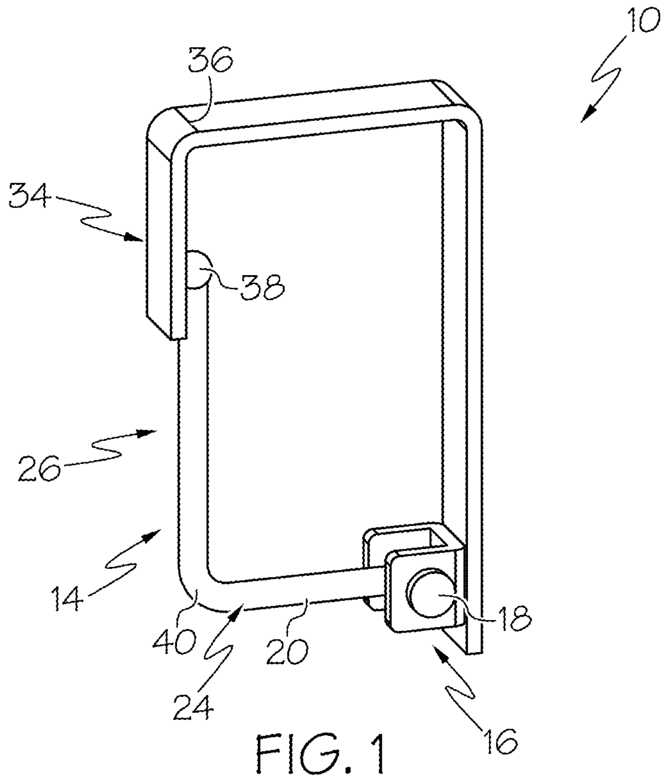
FIG. 1 is a diagrammatic view of a door lock device with a pivot arm in an engaged position, according to one or more embodiments shown and described herein.

Referring to FIG. 1, a door lock device 10 includes a base plate 12 that is configured to mount to a wall of a storage trailer of a truck. The base plate 12 may be planar or otherwise shaped and configured to mount flush to the wall of the storage trailer. A pivot hook 14 is pivotally connected to the base plate 12 using a mount 16. The mount 16 may include a pin 18 that is mounted to an end 20 of the pivot hook 14 providing a pivot location, also represented by element 18. In some embodiments, a spring, represented by element 22, may be attached to the pin 18 and the end 20 of the pivot hook 14 to bias the pivot hook 14 toward a engaged position, as shown in FIG. 1.

The pivot hook 14 includes a transverse portion 24 that extends generally perpendicularly outward from the base plate 12 with the pivot hook 14 in the engaged position and a lock portion 26 that extends generally perpendicularly from the transverse portion 24, forming an L-shape. A guard arm 30 includes a transverse portion 32 that extends generally perpendicularly outward from the base plate 12, over the transverse and lock portions 24 and 26 of the pivot hook 14 and an interlock portion 34 that engages the lock portion 26 of the pivot hook 14 in the engaged position. In some embodiments as shown, the interlock portion 34 extends downward from an end 36 of the transverse portion 32 of the guard arm 30 that is located spaced above an end 38 of the lock portion 26 of the pivot hook 14 past the end 36 of the transverse portion 32 and alongside the lock portion 26, terminating prior to reaching a bend 40 between and connecting the lock portion 26 and the transverse portion 24 of the pivot hook 14.

Figure 2:
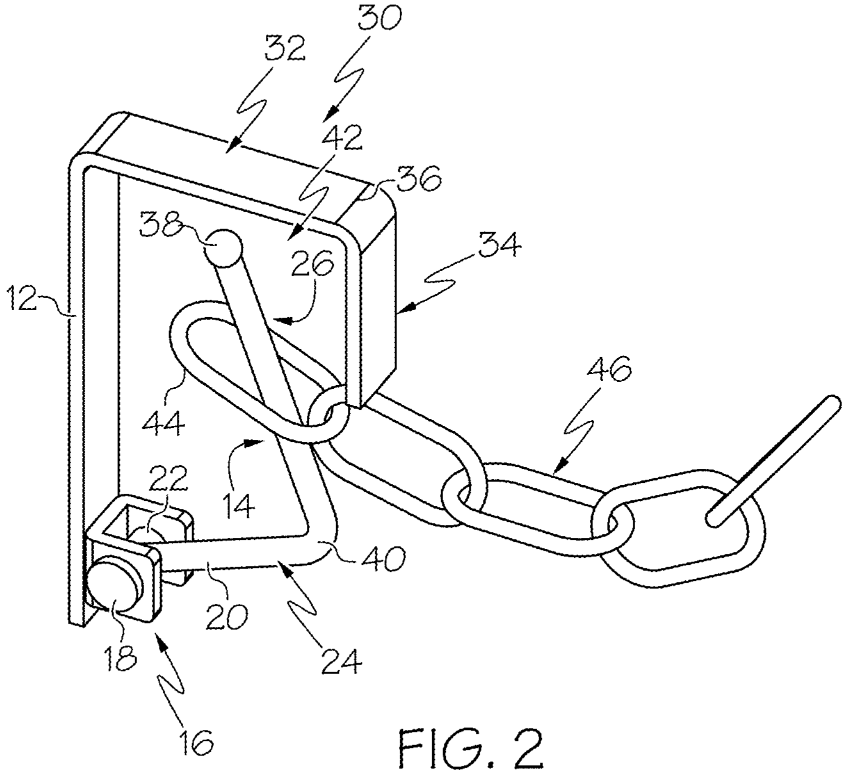
FIG. 2 is a diagrammatic view of the door lock device of FIG. 1 with the pivot arm in an open position and a link of a chain around the pivot arm, according to one or more embodiments shown and described herein.

Referring also to FIG. 2, the pivot hook 14 pivots from the engaged position of FIG. 1 engaging the interlock portion 34 of the guard arm 30 to an open position moved away from the guard arm 30 providing a gap 42 therebetween. The gap 42 may be provided in order to slip a link 44 of a chain 46 around the lock portion 26 of the pivot hook 14. While a chain 46 is illustrated, any suitable flexible elongated connector may be used, such as a rope or cable with an end that is configured to slip around the lock portion 26. Once the link 44 is placed around the lock portion 26, the pivot hook 14, the chain 46 can be leased and the spring bias provided by spring 22, if provided, and weight of the chain and/or the door the chain 46 is connected to can provide a force against the pivot hook 14 to hold the pivot hook 14 against the guard arm 30 thereby providing an unlock prevention mechanism.

Figure 3:
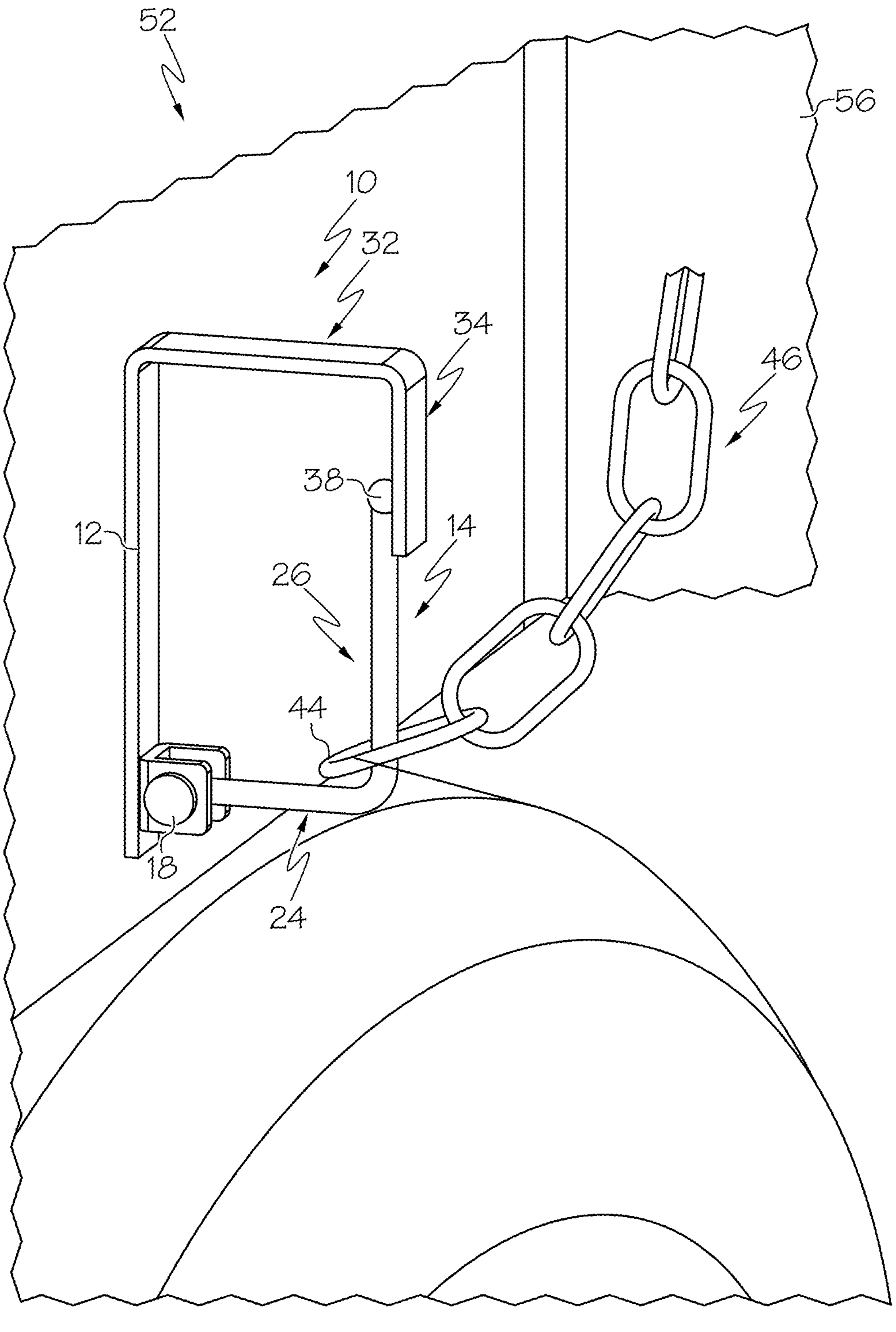
FIG. 3 is a diagrammatic view of the door lock device of FIG. 1 mounted to a side of a trailer and in use holding a trailer door in an open position, according to one or more embodiments shown and described herein.

FIG. 3 illustrates the door lock device 10 in use and with chain 46 connected to a trailer door 50 of a trailer 52. As can be seen, the base plate 12 is configured to mount to a wall of the trailer 52 adjacent trailer door 50. With the trailer door 50 open, the chain 46 is sized such that the link 44 can reach the lock portion 26 of the pivot hook 14. Referring also to FIG. 2, the pivot hook 14 is pivoted to the open position providing the gap 42 and the link 44 is placed around the lock portion 26. Then, the pivot hook 14 is released and the pivot hook 14 pivots back to the engaged position of the force provided by the spring 22 and/or the chain 46 due to the weight the chain 46 and the force of the trailer door 50. The end 38 of the pivot hook 14 remains engaged with the interlock portion 34 of the guard arm 30.

The above-described door lock devices provide a reliable locking arrangement for securing a chain or other connection thereto. In the illustrated example, the door lock devices are used to secure a trailer door in an open position so that the trailer door does not swing unintentionally to a closed position. The use of the pivot hook in combination with the guard arm can provide a closed loop in the closed position that can provide an unlock prevention mechanism that is biased toward the closed position be a spring and/or weight of a chain.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A door lock device comprising:

a base plate;

a pivot hook connected to the base plate configured to pivot about a pivot axis; and a guard arm connected to the base plate that extends past an end of the pivot hook such that the pivot hook rests against the guard arm when pivoted to an engaged position, the pivot hook configured to be biased against guard arm due, at least in part, to a force applied by a chain connected to the pivot hook;

wherein the pivot hook is a rod that comprises a transverse portion extending along a first length of the rod that is pivotally connected to a mount that is connected directly to the base plate at a location spaced from the guard arm, the transverse portion extending outwardly away from a pin pivotally connected to the mount, the rod further comprising a lock portion extending along a second length of the rod adjacent the first length and extending from the transverse portion of the pivot hook toward the guard arm.

2. The door lock device of claim 1, wherein the pivot hook is configured to pivot from the engaged position to an open position to provide a gap between the end of the pivot hook and the interlock portion of the guard arm.

3. The door lock device of claim 1 further comprising a spring that biases the pivot hook toward the engaged position.

4. A trailer comprising:

a trailer door that is pivotally mounted to the trailer;

a door lock device comprising:

a base plate mounted to the trailer;

a pivot hook connected to the base plate configured to pivot about a pivot axis; and a guard arm connected to the base plate that extends past an end of the pivot hook such that the pivot hook rests against the guard arm when pivoted to an engaged position, the pivot hook configured to be biased against guard arm due, at least in part, to a force applied by a chain hooked to the pivot hook;

wherein the pivot hook is a rod that comprises a transverse portion that extends outwardly away from the base plate and a lock portion that extends from the transverse portion of the pivot hook toward the guard arm, extending along a first length of the rod that is pivotally connected to a mount that is connected directly to the base plate at a location spaced from the guard arm, the transverse portion extending outwardly away from a pin pivotally connected to the mount, the rod further comprising a lock portion extending along a second length of the rod adjacent the first length and extending from the transverse portion of the pivot hook toward the guard arm.

5. The trailer of claim 4, wherein the pivot hook is configured to pivot from the engaged position to an open position to provide a gap between the end of the pivot hook and the interlock portion of the guard arm.

6. The trailer of claim 4 further comprising a spring that biases the pivot hook toward the engaged position.

7. A method of securing a trailer door of a trailer in an open position using a door lock device, the method comprising:

mounting the door lock device to the trailer adjacent the trailer door, the door lock device comprising:

a base plate configured to mount to the trailer;

a pivot hook connected to the base plate configured to pivot about a pivot axis; and a guard arm connected to the base plate that extends past an end of the pivot hook such that the pivot hook rests against the guard arm when pivoted to an engaged position, the pivot hook configured to be biased against guard arm due, at least in part, to a force applied by a chain hooked to the pivot hook;

wherein the pivot hook is a rod that comprises a transverse portion extending along a first length of the rod that is pivotally connected to a mount that is connected directly to the base plate at a location spaced from the guard arm, the transverse portion extending outwardly away from a pin pivotally connected to the mount, the rod further comprising a lock portion extending along a second length of the rod adjacent the first length and extending from the transverse portion of the pivot hook toward the guard arm;

pivoting the pivot hook toward an open position providing a gap between the pivot hook and the guard arm;

placing a link of a flexible, elongated connector mounted to the trailer door around the pivot hook with the pivot hook in the open position; and placing the pivot hook in the closed position and resting against the guard arm with the link around the pivot hook.

8. The method of claim 7, wherein the step of placing the pivot hook in the closed position comprises biasing the pivot hook toward the closed position.

9. The method of claim 8, wherein the pivot hook is biased toward the closed position by a spring.

* * * * *